(12) United States Patent
De Waal Malefijt et al.

(10) Patent No.: US 10,815,970 B2
(45) Date of Patent: Oct. 27, 2020

(54) SYSTEM FOR TRANSPORT AND/OR STORAGE OF WIND TURBINE BLADE SHELL HALF PARTS AND RELATED METHOD

(71) Applicant: LM WP PATENT HOLDING A/S, Kolding (DK)

(72) Inventors: Bernard Willem De Waal Malefijt, Aabenraa (DK); Jacobus Van Der Zee, Kolding (DK); Khajasab Khajasab, Karnataka (IN)

(73) Assignee: LM WP PATENT HOLDING A/S, Kolding (DK)

(*) Notice: Subject to any disclaimer, the term of this patent is extended or adjusted under 35 U.S.C. 154(b) by 121 days.

(21) Appl. No.: 16/083,642

(22) PCT Filed: Mar. 9, 2017

(86) PCT No.: PCT/EP2017/055579
§ 371 (c)(1),
(2) Date: Sep. 10, 2018

(87) PCT Pub. No.: WO2017/153535
PCT Pub. Date: Sep. 14, 2017

(65) Prior Publication Data
US 2019/0345917 A1    Nov. 14, 2019

(30) Foreign Application Priority Data
Mar. 11, 2016    (EP) .................................. 16159944

(51) Int. Cl.
*B60P 3/40*    (2006.01)
*F03D 13/40*    (2016.01)
*B65G 57/03*    (2006.01)

(52) U.S. Cl.
CPC ............. *F03D 13/40* (2016.05); *B65G 57/03* (2013.01); *B60P 3/40* (2013.01); *F05B 2260/02* (2013.01)

(58) Field of Classification Search
CPC . F03D 13/40; B60P 3/40; B65G 57/03; F05B 2260/02
USPC .......................................................... 410/44
See application file for complete search history.

(56) References Cited

U.S. PATENT DOCUMENTS

| | | | |
|---|---|---|---|
| 8,511,921 B2 * | 8/2013 | Riddell | B60P 3/40 401/44 |
| 9,494,140 B2 * | 11/2016 | Sigurdsson | A47B 81/00 |
| 10,385,827 B2 * | 8/2019 | Botwright | B63B 35/003 |

(Continued)

*Primary Examiner* — Gregory A Blankenship
(74) *Attorney, Agent, or Firm* — Nath, Goldberg & Meyer; Jerald L. Meyer; Tanya E. Harkins

(57) ABSTRACT

A transport system for transport of blade shell half parts of a wind turbine blade, the blade shell half parts each having a tip end and a root end, wherein the transport system comprises a frame assembly comprising a first transport frame; and a first set of one or more separator elements, the first set of separator elements including a first primary separator element configured to separate a first blade shell half part and a second blade shell half part neighbouring the first blade shell half part such that the second blade shell half part is at least partly stacked above the first blade shell half part. Further, a blade shell half part system comprising the transport system and a plurality of blade shell half parts and related method is disclosed.

16 Claims, 7 Drawing Sheets

(56) References Cited

U.S. PATENT DOCUMENTS

Figure 1:
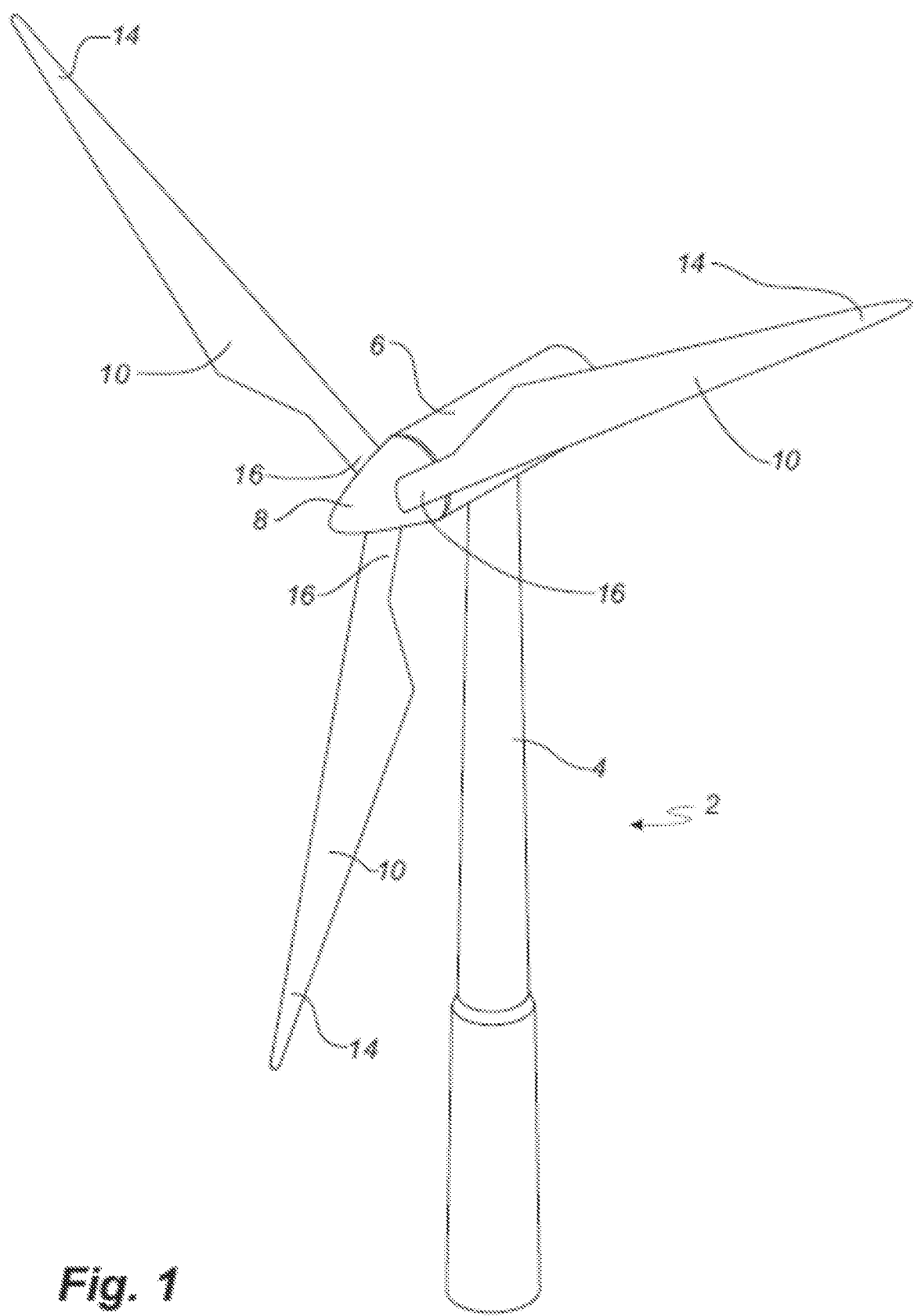

| | | | |
|---|---|---|---|
| 2011/0142660 A1* | 6/2011 | Bakhuis | B60P 3/40 |
| | | | 416/223 R |
| 2013/0119002 A1* | 5/2013 | Frederiksen | B65D 88/129 |
| | | | 211/60.1 |
| 2013/0319891 A1* | 12/2013 | Lieberknecht | B65D 85/68 |
| | | | 206/448 |
| 2014/0314576 A1* | 10/2014 | Lieberknecht | F03D 13/40 |
| | | | 416/220 R |
| 2015/0300314 A1* | 10/2015 | Van Der Zee | F16B 2/08 |
| | | | 211/85.8 |
| 2016/0258422 A1* | 9/2016 | Sigurdsson | F03D 13/40 |
| 2017/0159646 A1* | 6/2017 | Thomsen | F03D 13/40 |
| 2017/0211548 A1* | 7/2017 | Van Der Zee | B61D 45/001 |

* cited by examiner

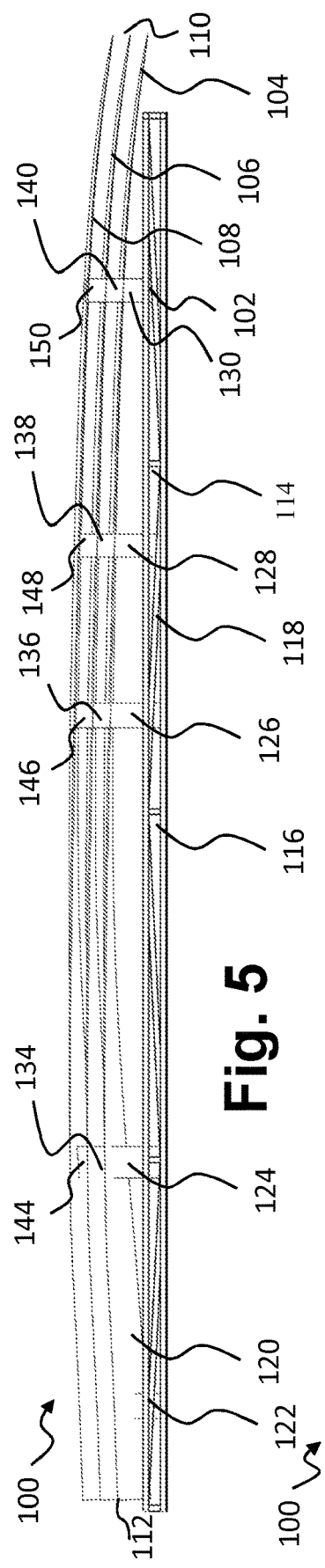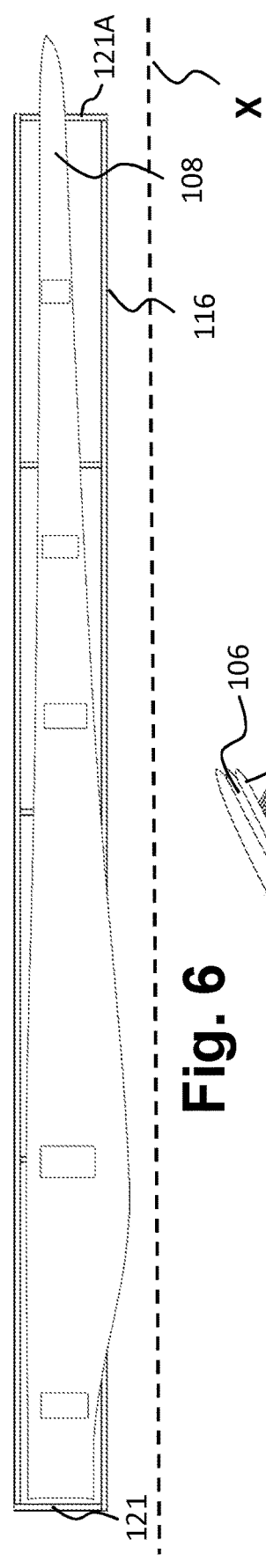

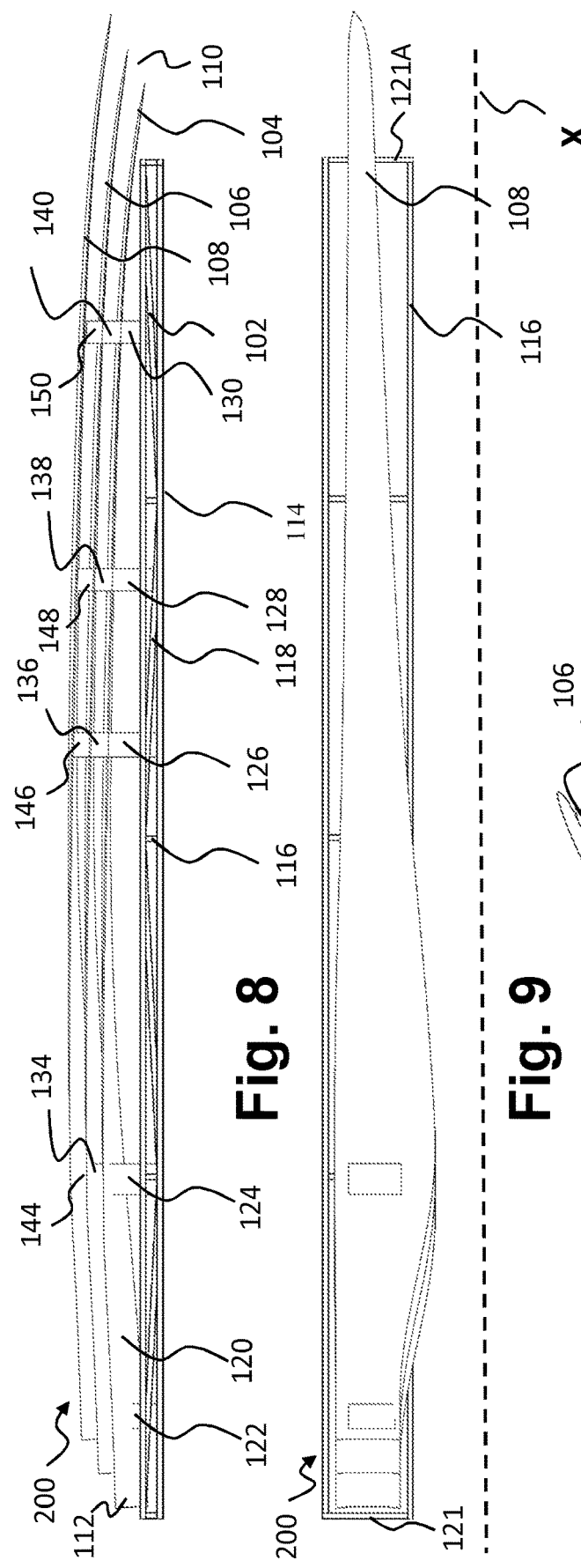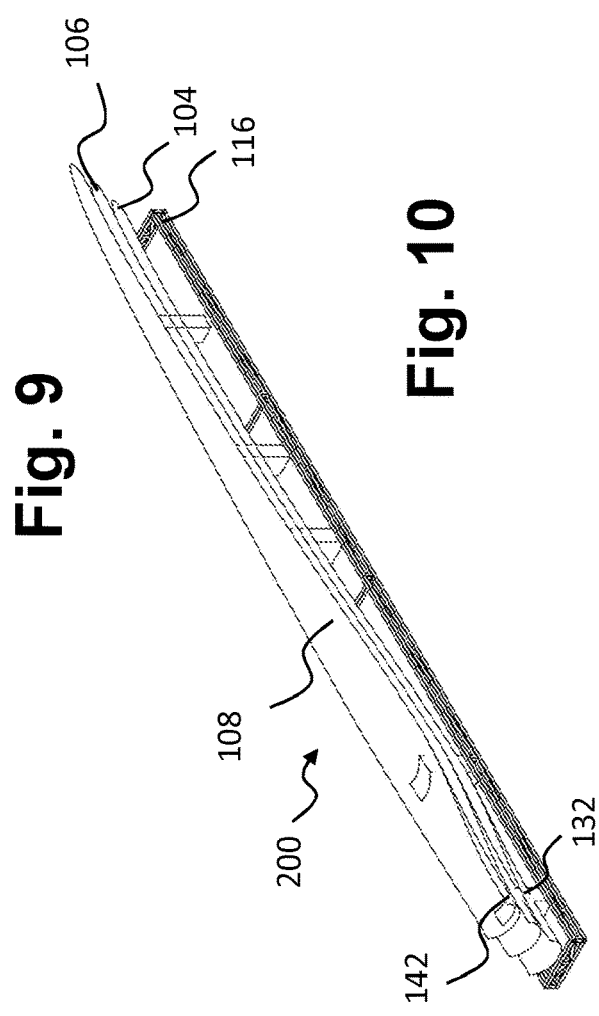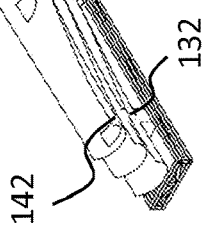

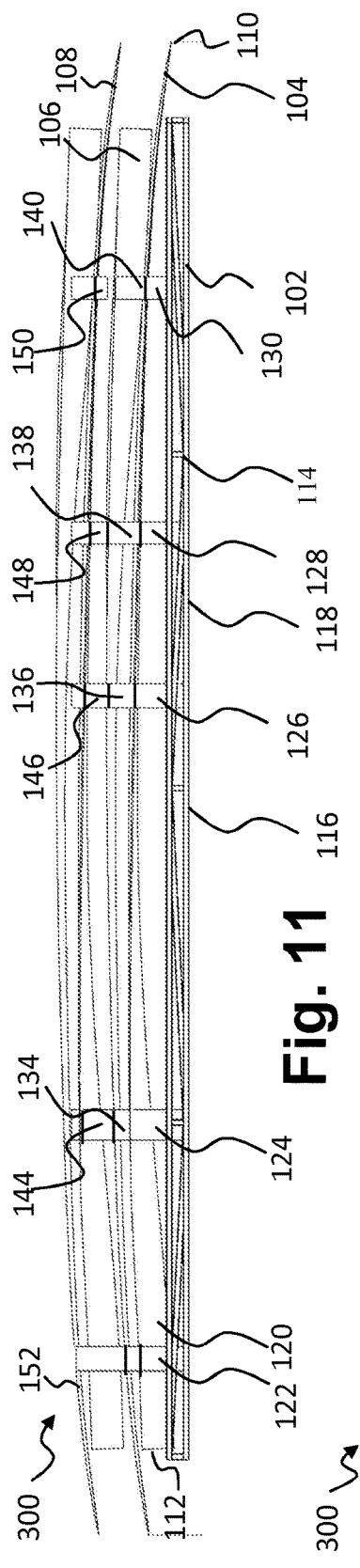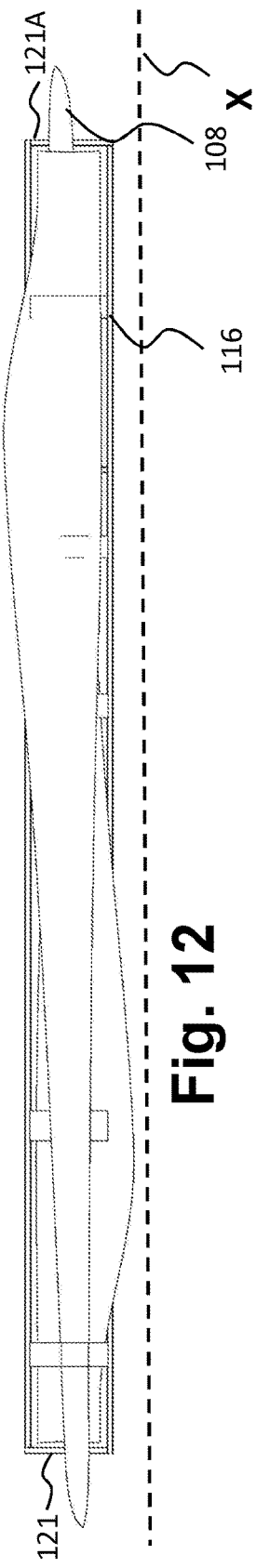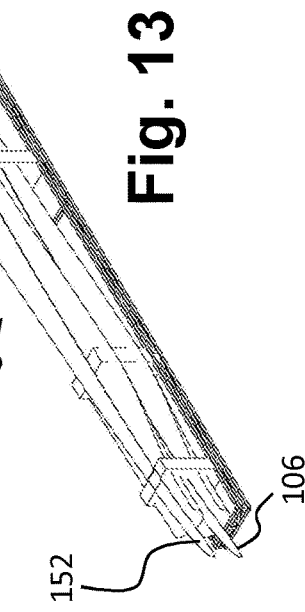

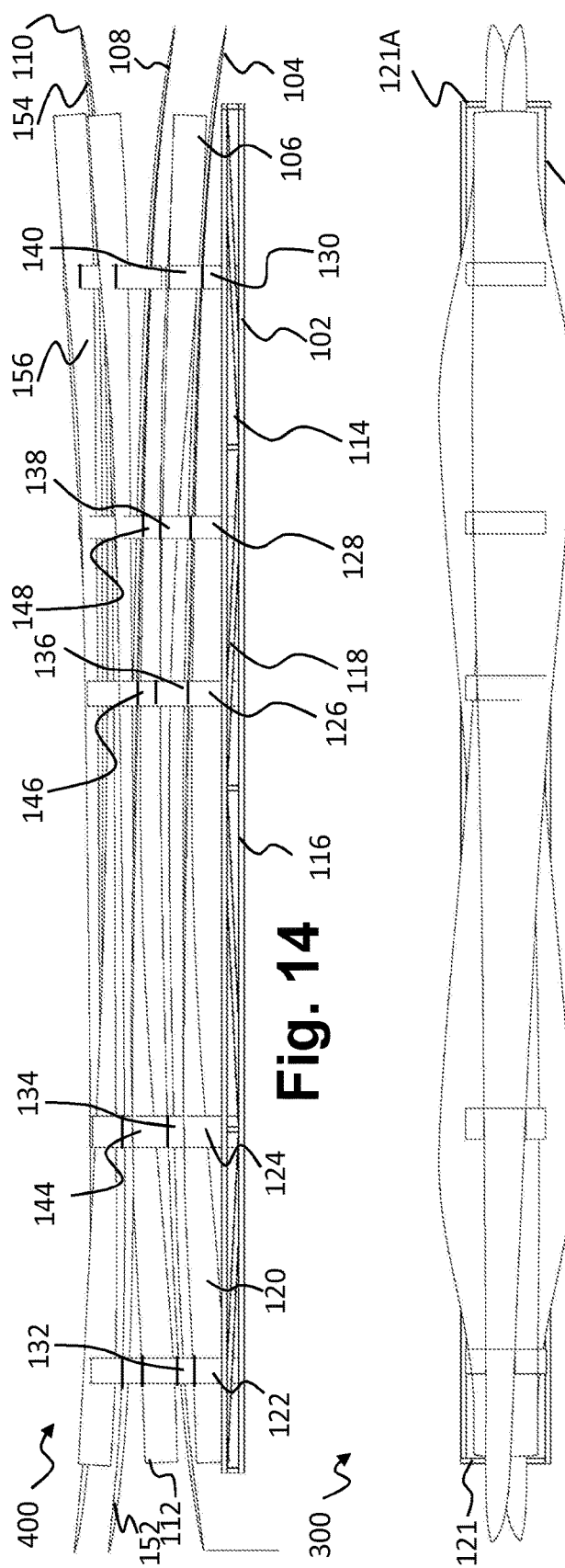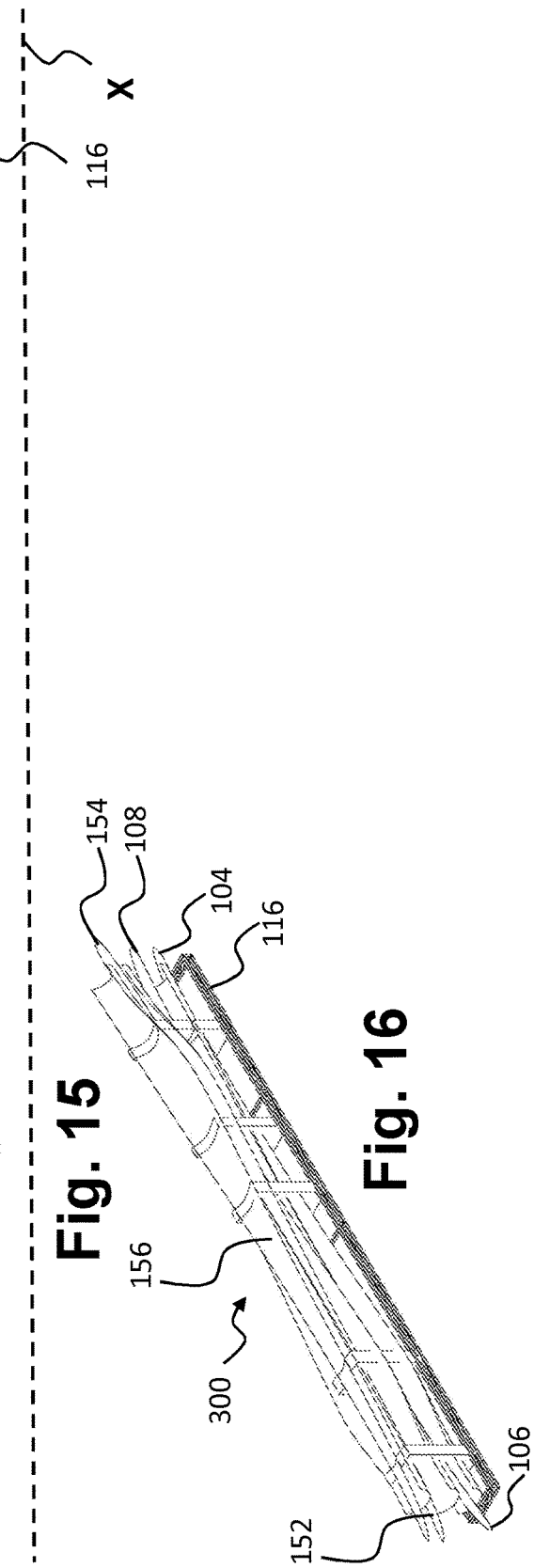

SYSTEM FOR TRANSPORT AND/OR STORAGE OF WIND TURBINE BLADE SHELL HALF PARTS AND RELATED METHOD

This is a National Phase Application filed under 35 U.S.C. 371 as a national stage of PCT/EP2017/055579, filed Mar. 9, 2017, an application claiming the benefit of European Application No. 16159944.4, filed Mar. 11, 2016, the content of each of which is hereby incorporated by reference in its entirety.

FIELD OF THE INVENTION

The present disclosure pertains to the field of handling wind turbine blade parts. In particular, the present disclosure relates to a system for transport and/or storage of blade shell half parts and a method of handling, e.g. transporting and/or storing, wind turbine blade parts.

BACKGROUND OF THE INVENTION

Wind turbine blades used for horizontal axis wind turbines for generating electrical power from the wind can be rather large and may today exceed 70 metres in length and 4 metres in width. The blades are typically made from a fibre-reinforced polymer material and comprising an upwind shell part and a downwind shell part. Due to the size and fragility of these large rotor blades, the blades may be damaged during transport as well as during loading and unloading. Such damages may seriously degrade the performance of the blades. Therefore, the blades need to be carefully packaged in order to ensure that they are not damaged.

However, due to the increasing length of modern wind turbine blades, it is gradually becoming more complicated and expensive to transport the assembled blades. It is not uncommon that the transportation costs amount to 20 percent of the total costs for manufacturing, transporting and mounting the wind turbine blade on the rotor of a wind turbine blade. Also, some blades are transported to the erection site through different modes of transport, such as by truck, train and ship. Some of these modes of transports may have restrictions on large loads, maximum heights, maximum widths, maximum distances between transport frames or supports, for instance dictated by local regulations. Therefore, there exists a logistic problem of providing transport solutions that are suitable for various types of transport.

Overall, there is a demand for making transport solutions simpler, safer and cheaper. The prior art shows various solutions for transporting more than one rotor blade using a single container or other packaging system, which is an obvious way to reduce the transport costs. However, the afore-mentioned restrictions and limits may increase the difficulty of transporting a plurality of blades using the same packaging system.

It is therefore an object of the invention to obtain a new method and system for storing and/or transporting a plurality of wind turbine blades, which overcome or ameliorate at least one of the disadvantages of the prior art or which provide a useful alternative.

SUMMARY OF THE INVENTION

Accordingly, there is provided a transport system for transport and/or storage of blade shell half parts of a wind turbine blade, the blade shell half parts each having a tip end and a root end, wherein the transport system comprises a frame assembly comprising a first transport frame; and a first set of one or more separator elements. The first set of separator elements includes a first primary separator element configured to separate a first blade shell half part and a second blade shell half part neighbouring the first blade shell half part. The first blade shell half part and the second blade shell half part may be separated such that the second blade shell half part is at least partly stacked above the first blade shell half part.

Also provided is a blade shell half part system comprising a transport system as described herein and a plurality of blade shell half parts each having a tip end and a root end and including a first blade shell half part and a second blade shell half part, wherein the first blade shell half part and the second blade shell half part are stacked on the frame assembly of the transport system.

Further, a method for transporting and/or storing a plurality of blade shell half parts is provided, the method comprising:
supporting a first blade shell half part with a frame assembly comprising a first transport frame;
arranging a first primary separator element on a surface of the first blade shell half part; and
stacking a second blade shell half part on the first primary separator element.

The disclosed systems and method enable a more volume-effective transport and/or storage of blade shell half parts for wind turbine blades. In particular, a reduced-height transport frame is provided for a given number of blade shell half parts allowing for relatively easier handling of the transport frame. The present disclosure relates to transport and/or storage of blade shell half parts that are not assembled to form a wind turbine blade A blade shell half part extends from a root end to a tip end and comprising a root region, a transition region, and an airfoil region. The transition region of the blade shell half part comprises a shoulder defining a maximum chord of the blade shell half part.

The method and/or systems advantageously relate to transport, such as road transport, rail transport and/or sea transport, and storage of blade shell half parts, e.g. having a blade length of at least 40 metres, or at least 45 metres, or even at least 50 metres. The method and/or systems may in particular be suitable for lifting and handling blade shell half parts. The blade shell half parts may be prebent so that, when assembled to a blade and mounted on an upwind configured horizontal wind turbine in a non-loaded state, they will curve forward out of the rotor plane so that the tip to tower clearance is increased. A blade shell half part has a tip end and a root end with an inner surface and an outer surface. The inner surface of a blade shell half part is a surface that is not exposed to the surroundings when the blade shell half part is assembled to a wind turbine blade. The outer surface of a blade shell half part is a surface that is exposed to the surroundings when the blade shell half part is assembled to a wind turbine blade.

The transport system comprises a frame assembly comprising at least a first transport frame. The frame assembly has a first end and a second end and extends along a longitudinal axis. The frame assembly may comprise a second transport frame and/or a third transport frame. The first transport frame may be connected, optionally detachably connected or hingedly connected, to the second transport frame. If present, the second transport frame may be connected, optionally detachably connected or hingedly connected, to the third transport frame. Detachable transport frames enable disassembly of the transport system when not in use, i.e. the transport system may take up much less space during return transport, while hinged transport frames may enable easy reconfiguration, e.g. stacking, of the frame assembly to a more convenient configuration for return transport, e.g. reduced length and slightly increased height.

A transport frame, such as the first transport frame and/or the second transport frame, has a first end and a second end. A transport frame, such as the first transport frame frame and/or the second transport frame, may comprise a frame body and at least one support element. The at least one support element includes a first support element configured to support a surface of a blade shell half part. The first support element may be configured to support the outer surface or the inner surface of a blade shell half part, such as the root region and/or the transition region of a blade shell half part. The at least one support element may comprise a second support element and/or a third support element configured to support a surface of a blade shell half part. The second support element and/or the third support element may be configured to support the outer surface or the inner surface of a blade shell half part, such as the transition region and/or the airfoil region of a blade shell half part.

The frame assembly may comprise a first sidewall and/or a second sidewall. Sidewalls of the frame assembly increase stiffness of the transport system and may provide protection of the blade shell half parts. The sidewall(s) may be connected, optionally detachably connected, to the frame body of the first transport frame. Detachable connection of sidewall(s) allows disassembly of the transport system upon transport/storage of the blade shell half parts.

The frame assembly may comprise one or more support arms. The support arm(s) may be connected, optionally detachably connected, to the frame body of the first transport frame and/or other transport frames. The support arm(s) may be extendable, such as telescopic. The support arm(s) may be L-shaped with the short side horizontally mounted to the frame body, e.g. such that the long side of the support arm is substantially vertical (±25 degrees with respect to vertical). Detachable connection of support arm(s) allows disassembly of the transport system upon transport/storage of the blade shell half parts. The support arm(s) may be configured to keep blade shell half parts from lateral displacement during transport. Support arms may be longitudinally distributed along the longitudinal axis of the frame assembly.

Thus, reduced transport and handling costs of the transport system are provided for when the transport system is not in use supporting blade shell half parts.

The transport system comprises one or more sets of separator elements. A set of separator elements, such as a first set of separator elements, may comprise one or more separator elements, such as one, two, three, four, five, six or more separator elements. The transport system comprises a first set of separator elements, the first set of separator elements including a first primary separator element. The first set of separator elements may comprise a first secondary separator element. The first set of separator elements may comprise a first tertiary separator element. The first set of separator elements may comprise a first quaternary separator element. The first set of separator elements may comprise a first quinary separator element.

The first set of separator elements, or at least a part thereof, may be configured so that at least a part of the second blade shell half part is received within a cavity of the first blade shell half part. For example, the first primary separator element may be configured so that a part of a root region and/or a transition region of the second blade shell half part is received within a cavity of a root region of the first blade shell half part. In one or more exemplary transport systems, the first primary separator element may be configured so that a part of an airfoil region of the second blade shell half part is received within a cavity of a root region and/or the transition region of the first blade shell half part.

The separator elements, or at least a part thereof, may be made of a polymer. Suitable polymers include polyethylene, polypropylene, polyester and polyurethane. The polymer may be a foamed polymer.

Separator element(s) may comprise a convex surface or a concave surface configured to contact the inner surface of a blade shell half part. Further, separator element(s) may comprise a convex or concave surface configured to contact an inner surface or an outer surface of a neighbouring blade shell half part. For example, the first primary separator element may comprise a convex surface configured to contact the inner surface of the first blade shell half part. In a transport system for a first blade shell half part with a downward facing inner surface, the first primary separator element may comprise a concave surface configured to contact the outer surface of the first blade shell half part. In one or more exemplary transport systems, the first primary separator element comprises a convex surface configured to contact the inner surface of the second blade shell half part or a concave surface configured to contact the outer surface of the second blade shell half part.

The first set of separator elements may be configured to separate a first blade shell half part and a second blade shell half part neighbouring the first blade shell half part, e.g. such that an inner surface of the first blade shell half part faces an outer surface of the second blade shell half part. It should of course be noted that blade shell half parts may be stacked such that an outer surface of the first blade shell half part faces the interior surface of the second blade shell half part, e.g. in a configuration where the inner surfaces of the blade shell half parts are facing downwards. Such configurations may be useful when stacking the same type of blade shell half parts.

The first set of separator elements may be configured to separate a first blade shell half part and a second blade shell half part neighbouring the first blade shell half part, e.g. such that an inner surface of the first blade shell half part faces an inner surface of the second blade shell half part. Such configuration may be useful for different types of blade shell half parts.

The transport system may comprise a second set of one or more separator elements, the second set of separator elements including a second primary separator element configured to separate the second blade shell half part and a third blade shell half part neighbouring the second blade shell half part.

The second set of separator elements may comprise a second secondary separator element. The second set of separator elements may comprise a second tertiary separator element. The second set of separator elements may comprise a second quaternary separator element. The second set of separator elements may comprise a second quinary separator element.

The second set of separator elements, or at least a part thereof, may be configured so that at least a part of the third blade shell half part is received within a cavity of the second blade shell half part. For example, the second primary separator element may be configured so that a part of a root region and/or a transition region of the third blade shell half part is received within a cavity of a root region of the second blade shell half part.

The second primary separator element may comprise a convex surface configured to contact the inner surface of the second blade shell half part. In a transport system for a second blade shell half part with a downward facing inner surface, the second primary separator element may comprise a concave surface configured to contact the outer surface of the second blade shell half part. In one or more exemplary transport systems, the second primary separator element comprises a convex surface configured to contact the inner surface of the third blade shell half part or a concave surface configured to contact the outer surface of the third blade shell half part.

The second set of separator elements may be configured to separate a second blade shell half part and a third blade shell half part neighbouring the second blade shell half part, e.g. such that an inner surface of the second blade shell half part faces an outer surface of the third blade shell half part. Such configuration may be useful when stacking the same type of blade shell half parts.

The second set of separator elements may be configured to separate a second blade shell half part and a third blade shell half part neighbouring the second blade shell half part, e.g. such that an inner surface of the second blade shell half part faces an inner surface of the third blade shell half part. Such configuration may be useful for different types of blade shell half parts.

The transport system may comprise at least three sets of separator elements, wherein each set of separator elements is configured to separate two neighbouring blade shell half parts.

The transport system may comprise a third set of one or more separator elements, the third set of separator elements including a third primary separator element configured to separate the third blade shell half part and a fourth blade shell half part neighbouring the third blade shell half part.

The transport system may comprise a fourth set of one or more separator elements, the fourth set of separator elements including a fourth primary separator element configured to separate the fourth blade shell half part and a fifth blade shell half part neighbouring the fourth blade shell half part.

The transport system may comprise a fifth set of one or more separator elements, the fifth set of separator elements including a fifth primary separator element configured to separate the fifth blade shell half part and a sixth blade shell half part neighbouring the fifth blade shell half part. A transport system including five sets of separator elements advantageously allows all blade shell half parts for a three-blade wind turbine to be stacked on the same frame assembly.

The blade shell half part system comprises a plurality of blade shell half parts including a first blade shell half part and a second blade shell half part. A blade shell half part may be one of two different types. A first type is an upwind shell half part (or a pressure shell half part), i.e. configured to form the upwind side of a wind turbine blade. A second type is a downwind shell half part (or a suction shell half part), i.e. configured to form the downwind side of a wind turbine blade. A blade shell half part may point in a first direction, i.e. the root end of the blade shell half part is arranged near the first end of the frame assembly. A blade shell half part may point in a second direction, i.e. the tip end blade shell half part is arranged near or at the first end of the frame assembly.

In one or more exemplary blade shell half part systems, separator elements of the first set of separator elements are distributed along the longitudinal axis between the root end and the tip end of the first blade shell half part.

In one or more exemplary blade shell half part systems, the first primary separator element and a second primary separator element at least partly overlap in the longitudinal direction. In other words, the first primary separator element and a second primary separator element may be arranged at the same or substantially the same longitudinal position or are longitudinally aligned. In one or more exemplary blade shell half part systems, a first secondary separator element and a second secondary separator element at least partly overlap in the longitudinal direction. Overlapping separator elements prevents or at least reduces mechanical stress on the blade shell half part arranged between the separator elements.

The first blade shell half part and the second blade shell half part may be stacked or arranged in a root end to root end arrangement, i.e. the first blade shell half part and the second blade shell half part point in the same direction.

The first blade shell half part and the second blade shell half part may be stacked or arranged in a root end to tip end arrangement i.e. the first blade shell half part and the second blade shell half part point in different directions (first or second direction).

In one or more exemplary blade shell half part systems, all blade shell half parts may be arranged in an alternating root end to tip end arrangement, i.e. where neighbouring blade shell half parts point in different directions (first or second direction). In one or more exemplary blade shell half part systems, the plurality of blade shell half parts may be arranged in a combined root end to root end and root end to tip end arrangement, i.e. where neighbouring blade shell half parts point in different directions (first or second direction).

In the blade shell half part system, at least a part of a blade shell half part may be received within a cavity of a neighbouring blade shell half part.

The first blade shell half part may be of the first type or of the second type.

The second blade shell half part may be of the first type or of the second type. The first blade shell half part and the second blade shell half part may be blade shell half parts of the same type or blade shell half parts of different types. The second blade shell half part may neighbour the first blade shell half part.

In the blade shell half part system, at least a part of the second blade shell half part may be received within a cavity of the first blade shell half part. For example, a part of the root region and/or the transition region of the second blade shell half part may be received within a root region cavity of the first blade shell half part. In one or more exemplary blade shell half part systems, a part of the airfoil region of the second blade shell half part may be received within a root region cavity of the first blade shell half part.

The plurality of blade shell half parts may include at least three blade shell half parts of the first type and/or at least three blade shell half parts of the second type.

The plurality of blade shell half parts may include a third blade shell half part. The third blade shell half part may be of the first type or of the second type. The third blade shell half part may neighbour the second blade shell half part. In one or more exemplary blade shell half part systems with a second and third blade shell half part, at least a part of the third blade shell half part may be received within a cavity of the second blade shell half part. For example, a part of the root region and/or the transition region of the third blade shell half part may be received within a root region cavity of the second blade shell half part. In one or more exemplary blade shell half part systems with a second and third blade shell half part, a part of the airfoil region of the third blade shell half part may be received within a root region cavity of the second blade shell half part.

The plurality of blade shell half parts may include a fourth blade shell half part. The fourth blade shell half part may be of the first type or of the second type. The fourth blade shell half part may neighbour the third blade shell half part. In one or more exemplary blade shell half part systems with a third and fourth blade shell half part, at least a part of the fourth blade shell half part may be received within a cavity of the third blade shell half part. For example, a part of the root region and/or the transition region of the fourth blade shell half part may be received within a root region cavity of the third blade shell half part. In one or more exemplary blade shell half part systems with a third and fourth blade shell half part, a part of the airfoil region of the fourth blade shell half part may be received within a root region cavity of the third blade shell half part.

The plurality of blade shell half parts may include a fifth blade shell half part. The fifth blade shell half part may be of the first type or of the second type. The fifth blade shell half part may neighbour the fourth blade shell half part.

The plurality of blade shell half parts may include a sixth blade shell half part. The sixth blade shell half part may be of the first type or of the second type. The sixth blade shell half part may neighbour the fifth blade shell half part.

In one or more exemplary blade shell half part systems, a blade shell half part may be arranged such that the inner surface of the blade shell half part faces the outer surface of a neighbouring blade shell half part. Thus, the first blade shell half part may be arranged such that the inner surface of the first blade shell half part faces the outer surface of the second blade shell half part. Further, the second blade shell half part may be arranged such that the inner surface of the second blade shell half part faces the outer surface of the third blade shell half part. This may be advantageous if the second blade shell half part and the third blade shell half part are of the same type.

In one or more exemplary blade shell half part systems, a blade shell half part may be arranged such that the inner surface of the blade shell half part faces the inner surface of a neighbouring blade shell half part. Thus, the first blade shell half part, may be arranged such that the inner surface of the first blade shell half part faces the inner surface of the second blade shell half part. This may be advantageous if the first blade shell half part and the second blade shell half part point are arranged in a root end to tip end arrangement and/or are of different type.

In one or more exemplary blade shell half part systems, a blade shell half part may be arranged at a longitudinal distance from a neighbouring blade shell half part pointing in the same direction. A longitudinal distance is measured along a longitudinal axis of the frame assembly. For example, in a root end to root end configuration, the second blade shell half part may be arranged with a longitudinal distance from the first blade shell half part. In other words, the first blade shell half part and the second blade shell half part may be longitudinally shifted.

In one or more exemplary blade shell half part systems, one or more wind turbine blade components, such as a shear web, may be arranged between two neighbouring blade shell half parts, such as between the first blade shell half part and the second blade shell half part and/or between the third blade shell half part and fourth blade shell half part.

Exemplary blade shell half part configurations (Emb 1, Emb 2, . . . , Emb 9) of a blade shell half part system are shown in table 1 below, where T1 indicates that the blade shell half part is of the first type (upwind), T2 indicates that the blade shell half part is of the second type (downwind). Further, A indicates that the blade shell half part is arranged with the outer surface facing downward and pointing in the first direction, B indicates that the blade shell half part is arranged with the outer surface facing downward and pointing in the second direction, C indicates that the blade shell half part is arranged with the inner surface facing downward and pointing in the first direction, D indicates that the blade shell half part is arranged with the inner surface facing downward and pointing in the second direction.

TABLE 1

| Exemplary blade shell half part configurations | | | | | | | | | |
|---|---|---|---|---|---|---|---|---|---|
| | Emb 1 | Emb 2 | Emb 3 | Emb 4 | Emb 5 | Emb 6 | Emb 7 | Emb 8 | Emb 9 |
| First blade shell half part | T1 A | T1 A | T1 A | T1 A | T1 A | T1 A | T2 A | T1 A | T2 C |
| Second blade shell half part | T1 A | T1 B | T1 B | T1 B | T2 D | T1 D | T2 A | T1 A | T1 B |
| Third blade shell half part | T1 A | T1 A | T1 A | T1 A | | | | T1 A | |
| Fourth blade shell half part | | | T2 B | T2 D | | | | T2 D | |
| Fifth blade shell half part | | | T2 A | T2 C | | | | T2 D | |
| Sixth blade shell half part | | | T2 B | T2 D | | | | T2 D | |

The method comprises supporting a first blade shell half part with a frame assembly comprising a first transport frame. The act of supporting a first blade shell half part with a frame assembly may comprise supporting a root region and/or a transition region, e.g. an outer surface and/or an inner surface of a root region and/or a transition region, of the first blade shell half part with a first support element of the first transport frame. The act of supporting a first blade shell half part with a frame assembly comprising a first transport frame may comprise supporting an airfoil region, e.g. an outer surface and/or an inner surface of an airfoil region, of the first blade shell half part with a second support element. The act of supporting a first blade shell half part with a frame assembly comprising a first transport frame may comprise supporting a transition region and/or an airfoil region, e.g. an outer surface and/or an inner surface, of the first blade shell half part with a third support element.

The method may comprise supporting a first blade shell half part with a second transport frame. The act of supporting a first blade shell half part with a second transport frame may comprise supporting an airfoil region, e.g. an outer surface and/or an inner surface of an airfoil region, of the first blade shell half part with a first support element of the second transport frame.

The method may comprise supporting a first blade shell half part with a third transport frame. The act of supporting a first blade shell half part with a third transport frame may comprise supporting a transition region and/or an airfoil region, e.g. an outer surface and/or an inner surface, of the first blade shell half part with a first support element of the third transport frame.

The method comprises arranging a first primary separator element on a surface, e.g. an outer surface or and inner surface, of the first blade shell half part. The act of arranging a first primary separator element on a surface of the first blade shell half part may comprise arranging the first primary separator element in a root region and/or in a transition region of the first blade shell half part.

The method may comprise arranging a first secondary separator element on a surface, e.g. an outer surface or and inner surface, of the first blade shell half part and stacking the second blade shell half part on the first secondary separator element. The act of arranging a first secondary separator element on a surface of the first blade shell half part may comprise arranging the first secondary separator element in an airfoil region of the first blade shell half part.

The method may comprise arranging a first tertiary separator element on a surface, e.g. an outer surface or an inner surface, of the first blade shell half part and stacking the second blade shell half part on the first tertiary separator element. The act of arranging a first tertiary separator element on a surface of the first blade shell half part may comprise arranging the first tertiary separator element in a transition region and/or an airfoil region of the first blade shell half part.

The method comprises stacking a second blade shell half part on the first primary separator element. The method may comprise stacking a second blade shell half part on the first primary separator element such that at least a part of the second blade shell half part is received within a cavity of the first blade shell half part and/or such that at least a part of the first blade shell half part is received within a cavity of the second blade shell half part.

The method may comprise arranging a second primary separator element on a surface of the second blade shell half part and stacking a third blade shell half part on the second primary separator element. The method may comprise arranging a second primary separator element on a surface of the second blade shell half part and stacking a third blade shell half part on the second primary separator element such that at least a part of the third blade shell half part is received within a cavity of the second blade shell half part and/or such that at least a part of the second blade shell half part is received within a cavity of the third blade shell half part.

In the systems and/or method, a blade shell half part may be arranged so that the tip end of the blade shell half part in a root end to tip end arrangement extends beyond the root end of a neighbouring blade shell half part. For example, the second blade shell half part may be arranged so that the tip end of the second blade shell half part in a root end to tip end arrangement extends beyond the root end of the first blade shell half part.

The first and second blade shell half parts may be arranged substantially parallel to each other and oriented in opposite directions.

According to one or more advantageous embodiments, the first blade shell half part and the second blade shell half part are stacked and/or arranged on top of each other, i.e. so that the second blade shell half part is arranged above the first blade shell half part. Advantageously, the first blade shell half part and the second blade shell half part are arranged so that chordal planes of their respective tip ends are arranged substantially horizontally. By "substantially horizontally" is meant that the chordal plane may vary up to +/−25 degrees to horizontal.

The frame assembly including the first transport frame and/or further transport frames may be used as a lifting tool so that two or more blade shell half parts may be lifted in one go and without imposing stress to the blade shell half parts.

In one of more exemplary transport systems, the longitudinal extent of the first transport frame is at least 5 metres. Preferably, the width of the first transport frame is equal to or greater than the bolt circle diameter of blade shell half parts to be arranged on the first transport frame. In one of more exemplary transport systems, the longitudinal extent of the frame assembly is at least 30 metres, such as at least 40 metres, such as even at least 50 metres.

The transport system is preferably used in the transport of blade shell half parts having a pre-bend $\Delta y$, and/or swept blade shell half parts.

It will be understood that any of the above-described features may be combined in any embodiment of the systems and/ method as described.

DETAILED DESCRIPTION

Figure 2:
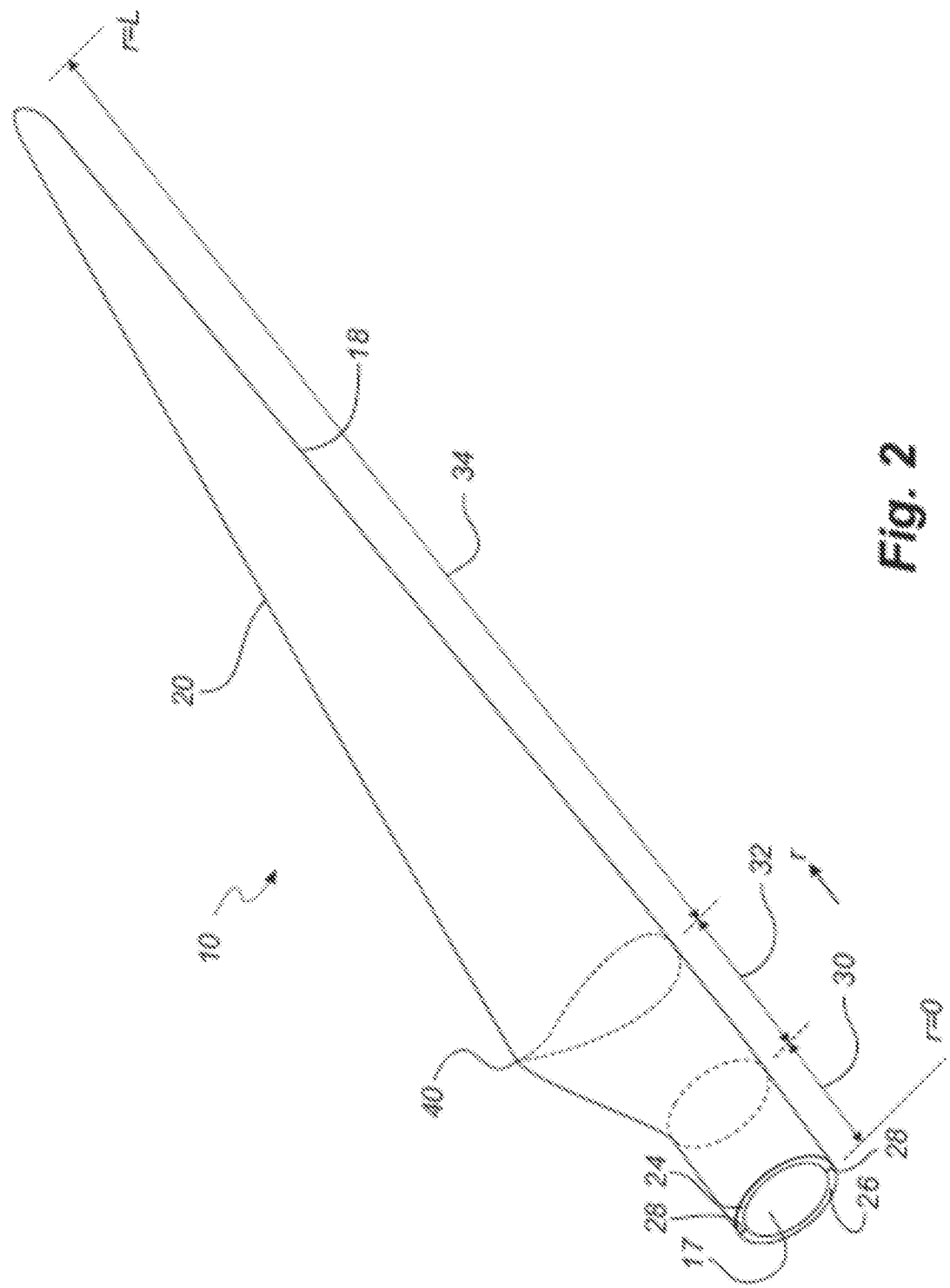
Figure 3:
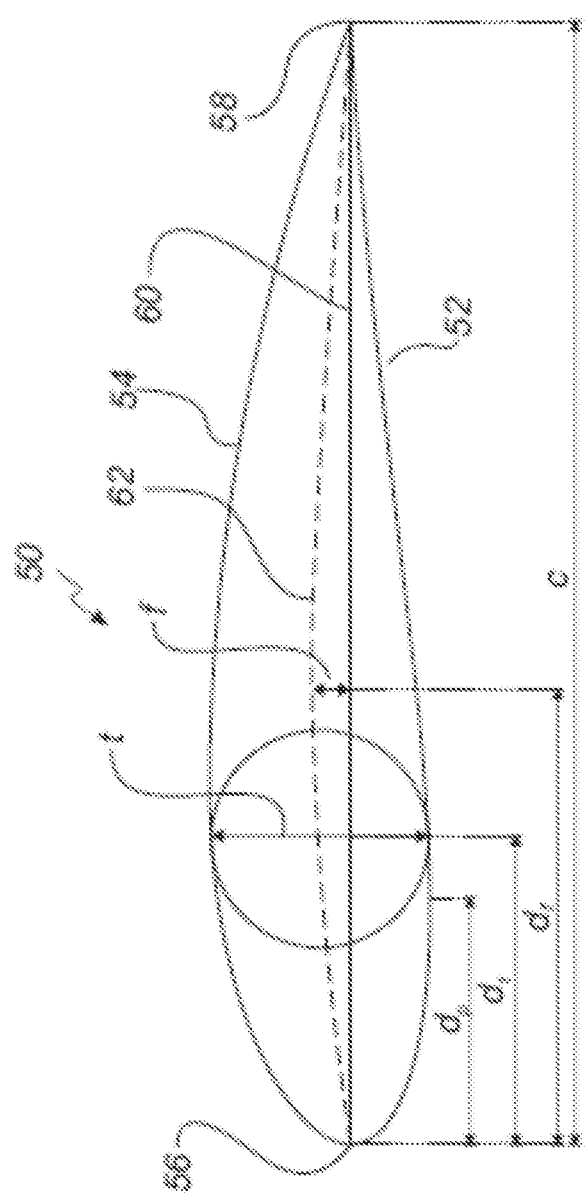
Figure 4:
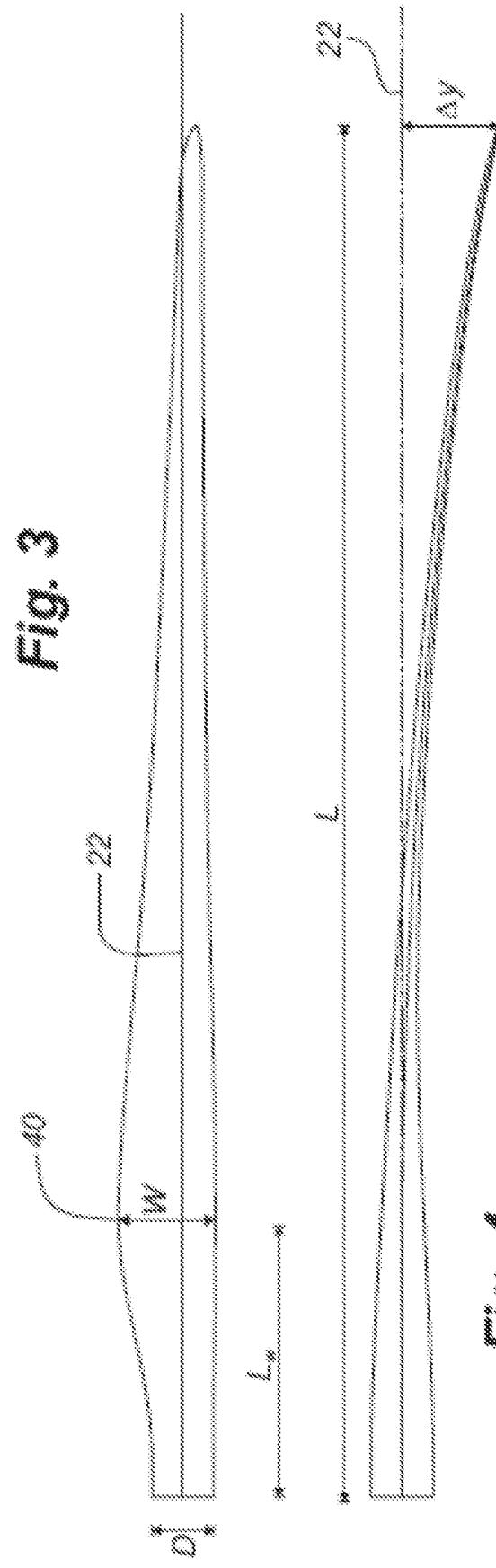

The invention is explained in detail below with reference to the drawings, in which FIG. 1 shows a wind turbine, FIG. 2 shows a schematic view of a wind turbine blade, FIG. 3 shows a schematic view of an airfoil profile, FIG. 4 shows a schematic view of a wind turbine blade, seen from above and from the side, FIG. 5 shows a schematic side view of an exemplary blade shell half part system according to the invention, FIG. 6 shows a schematic top view of the blade shell half part system of FIG. 5, FIG. 7 shows a schematic perspective view of the blade shell half part system of FIG. 5, FIG. 8 shows a schematic side view of an exemplary blade shell half part system according to the invention, FIG. 9 shows a schematic top view of the blade shell half part system of FIG. 8, FIG. 10 shows a schematic perspective view of the blade shell half part system of FIG. 8, FIG. 11 shows a schematic side view of an exemplary blade shell half part system according to the invention, FIG. 12 shows a schematic top view of the blade shell half part system of FIG. 11, FIG. 13 shows a schematic perspective view of the blade shell half part system of FIG. 11, FIG. 14 shows a schematic side view of an exemplary blade shell half part system according to the invention, FIG. 15 shows a schematic top view of the blade shell half part system of FIG. 14, and FIG. 16 shows a schematic perspective view of the blade shell half part system of FIG. 15.

The present invention relates to transport and storage of blade shell half parts of wind turbine blades for horizontal axis wind turbines (HAWTs).

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of an exemplary wind turbine blade 10. The wind turbine blade 10 has the shape of a conventional wind turbine blade with a root end and a tip end and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a shell comprising two blade shell half parts made of fibre-reinforced polymer and is typically made as a pressure side or upwind blade shell half part 24 and a suction side or downwind blade shell half part 26 that are glued together along bond lines 28 extending along the trailing edge 20 and the leading edge 18 of the blade 10.

FIGS. 3 and 4 depict parameters, which may be used to explain the geometry of blade shell half parts to be stored and transported according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade and blade shell half parts. The blade and blade shell half parts have a total blade length L. As shown in FIG. 3, the root end is located at position r=0, and the tip end located at r=L. The shoulder 40 of the blade shell half parts is located at a position $r=L_w$, and has a shoulder width W, which equals the chord length at the shoulder 40. The diameter of the root is defined as X. Further, the blade/blade shell half parts is provided with a prebend, which is defined as Δy, which corresponds to the out of plane deflection from a pitch axis 22 of the blade.

Blades have over the time become longer and longer and may now exceed a length of 70 metres. Further, the root diameter of blades has increased. The length of the blade, the root diameter as well as the shape of the blades with respect to shoulder, twist and prebending makes it increasingly difficult to transport the blades, in particular if a plurality of blades is to be transported and stored together. The shape and size of the blades also puts limitations on how closely the blades can be stored in a stacked array.

FIGS. 5-7 shows different schematic views of an exemplary blade shell half part system according to the invention for transporting and storing a plurality of blade shell half parts. The blade shell half part system 100 comprises a transport system 102 and a plurality of blade shell half parts including a first blade shell half part 104, a second blade shell half part 106 and an optional third blade shell half part 108. The blade shell half parts 104, 106, 108 are of a first type (upwind). Each blade shell half part 104, 106, 108 has a tip end 110 and a root end 112. The transport system 102 comprises a frame assembly 114 comprising a first transport frame 116 comprising a frame body 118 and at least one support element configured to support the outer surface 120 of the first blade shell half part 104. The root ends of blade shell half parts 104, 106, 108 are arranged at a first end 121 of the frame assembly pointing in the first direction. The at least one support element comprises a first support element 122, a second support element 124, a third support element 126, a fourth support element 128 and a fifth support element 130 longitudinally distributed along the first blade shell half part 104. The support elements 122, 124, 126, 128, 130 are preferably made of or at least comprises a foamed polymer and each has a surface, such as a concave surface, configured to contact and support the outer surface 120 of the first blade shell half part 104. The support elements are mounted on, such as detachably mounted, the frame body 118 of first transport frame 116.

In the blade shell half part system 100, the blade shell half parts 104, 106, 108 are stacked in a root end to root end configuration on the frame assembly 114 with the outer surface of the blade shell half parts facing downwards. Further blade shell half parts may be stacked above the third blade shell half part 108. The inner surface of the first blade shell half part 104 faces the outer surface of the neighbouring second half part shell 106 and the inner surface of the second blade shell half part 106 faces the outer surface of the neighbouring third half part shell 108. The root ends of the blade shell half parts 104, 106, 108 are longitudinally aligned along longitudinal axis indicated with dotted line X in FIG. 6.

The transport system 102 comprises a first set of one or more separator elements arranged between and separating the first blade shell half part 104 and the second blade shell half part 106. The first set of separator elements comprises a first primary separator element 132 configured to and arranged to separate the first blade shell half part 104 and the second blade shell half part 106 neighbouring the first blade shell half part such that the second blade shell half part is at least partly stacked above the first blade shell half part. The first separator element 132 is arranged in the root region and/or the transition region of the first blade shell half part 104 such that a part of the root region of the second blade shell half part 106 is received within a root region cavity of the first blade shell half part 104, see FIG. 7. The first set of separator elements comprises in the illustrated system five separator elements 132, 134, 136, 138, 140. Each separator element 132, 134, 136, 138, 140 at least partly overlaps respective support elements 122, 124, 126, 128, 130 in a longitudinal direction parallel to the longitudinal axis X.

The first set of separator elements is configured to contact the inner surface of the first blade shell half part 104 and configured to contact the outer surface of the second blade shell half part 106.

The first primary separator element 132 and the first secondary separator element 134 each comprises a convex surface configured to contact the inner surface of the first blade shell half part 104. Further, the first primary separator element 132 and the first secondary separator elements 134 each comprises a concave surface configured to contact the outer surface of the second blade shell half part 106.

The transport system 102 comprises a second set of one or more separator elements arranged between and separating the second blade shell half part 106 and the third blade shell half part 108. The second set of separator elements comprises a second primary separator element 142 configured to and arranged to separate the second blade shell half part 106 and the third blade shell half part 108 neighbouring the second blade shell half part such that the third blade shell half part is at least partly stacked above the second blade shell half part. The second primary separator element 142 is arranged in the root region and/or the transition region of the second blade shell half part 106 such that a part of the root region of the third blade shell half part 108 is received within a root region cavity of the second blade shell half part 106, see FIG. 7 The second set of separator elements comprises in the illustrated system five separator elements 142, 144, 146, 148, 150. Each separator element 142, 144, 146, 148, 150 at least partly overlaps respective support elements 122, 124, 126, 128, 130 in a longitudinal direction parallel to the longitudinal axis X.

The second set of separator elements is configured to contact the inner surface of the second blade shell half part 106 and configured to contact the outer surface of the third blade shell half part 108.

The second primary separator element 142 and the second secondary separator element 144 each comprises a convex surface configured to contact the inner surface of the second blade shell half part 106. Further, the second primary separator element 142 and the second secondary separator element 144 each comprises a concave surface configured to contact the outer surface of the third blade shell half part 108.

While the above embodiment has been described with respect to a first type (upwind) blade shell half parts, it is clear that a similar embodiment can be used for a second type (downwind) shell half parts. Thus, the first type and second type blade shell halfs may be transported separately to a place of assembly or erection of a wind turbine.

FIGS. 8-10 show different schematic views of an exemplary blade shell half part system according to the invention for transporting and storing a plurality of blade shell half parts similar to the blade shell half part system 100. In the blade shell half part system 200, the second blade shell half part 106 is arranged at a longitudinal distance from the first shell blade half part 104. Further, the third blade shell half part 108 is arranged at a longitudinal distance from the second shell blade half part 106. In other words, the positions of the blade shell half parts are mutually shifted in the longitudinal direction.

In one or more exemplary blade shell half part systems, a blade shell half part may be arranged at a longitudinal distance from a neighbouring blade shell half part pointing in the same direction. A longitudinal distance is measured along a longitudinal axis of the frame assembly. For example, in a root end to root end configuration, the second blade shell half part may be arranged with a longitudinal distance from the first blade shell half part. In other words, the first blade shell half part and the second blade shell half part may be longitudinally shifted.

FIGS. 11-13 show different schematic views of an exemplary blade shell half part system according to the invention for transporting and storing a plurality of blade shell half parts. The blade shell half part system 300 comprises a transport system 102 and a plurality of blade shell half parts including a first blade shell half part 104, a second blade shell half part 106, a third blade shell half part 108, a fourth blade shell half part 152, a fifth blade shell half part 154, and a sixth blade shell half part 156. The blade shell half parts 104, 106, 108 are of a first type (upwind) and the blade shell half parts 152, 154, 156 are of a second type (downwind). Each blade shell half part 104, 106, 108, 152, 154, 156 has a tip end 110 and a root end 112. The transport system 102 comprises a frame assembly 114 comprising a first transport frame 116 comprising a frame body 118 and at least one support element configured to support the outer surface 120 of the first blade shell half part 104. The root ends of blade shell half parts 104, 108, and 154 are arranged at a first end 121 of the frame assembly pointing in the first direction. The tip ends of blade shell half parts 106, 152, 156 are arranged at the first end 121 of the frame assembly, the blade shell half parts 106, 152, 156 pointing in a second direction opposite the first direction.

The at least one support element comprises a first support element 122, a second support element 124, a third support element 126, a fourth support element 128 and a fifth support element 130 longitudinally distributed along the first blade shell half part 104. The support elements 122, 124, 126, 128, 130 are preferably made of or at least comprises a foamed polymer and each has a surface, such as a concave surface, configured to contact and support the outer surface 120 of the first blade shell half part 104. The support elements are mounted on, such as detachably mounted, the frame body 118 of first transport frame 116.

In the blade shell half part system 300, the blade shell half parts 104, 106, 108, 152, 154, 156 are stacked in an alternating root end to tip end configuration or arrangement on the frame assembly 114 with the outer surface of the blade shell half parts facing downwards. In other blade shell half part systems, the inner surface of the blade shell half parts 152, 154, 156 of the second type (downwind) may face downwards. The blade shell half part system 300 may be advantageous in comprising blade shell half parts for a full three blade HAWT.

In the blade shell half part system 300, the outer surface of respective blade shell half parts 104, 106, 108, 152, 154, 156 faces downward. Further, the blade shell half parts are arranged so that the tip end of respective blade shell half parts 104, 106, 108, 152, 154, 156 extends beyond the root end of a neighbouring blade shell half part.

In the blade shell half part system 300, the transport system 102 comprises a first set of five separator elements arranged between and separating the first blade shell half part 104 and the second blade shell half part 106, a second set of five separator elements arranged between and separating the second blade shell half part 106 and the third blade shell half part 108, a third set of five separator elements arranged between and separating the third blade shell half part 108 and the fourth blade shell half part 152, a fourth set of five separator elements arranged between and separating the fourth blade shell half part 152 and the fifth blade shell half part 154, and a fifth set of five separator elements arranged between and separating the fifth blade shell half part 154 and the sixth blade shell half part 156. Each separator element of a set of separator elements at least partly overlaps corresponding separator elements in the other sets of separator elements. For example, a tertiary separator element of each set of separator elements at least partly overlaps with tertiary separator elements of the other sets of separator elements.

FIGS. 14-16 show different schematic views of an exemplary blade shell half part system according to the invention for transporting and storing a plurality of blade shell half parts. The blade shell half part system 400 comprises a transport system 102 and a plurality of blade shell half parts including at least four blade shell half parts. The blade shell half part system 400 comprises a first blade shell half part 104, a second blade shell half part 106, a third blade shell half part 108, and a fourth blade shell half part 152 of the same type (upwind) in an alternating root end to tip end arrangement.

In the blade shell half part system 400, the outer surface of respective blade shell half parts 104, 106, 108, 152 faces downward. Further, the blade shell half parts are arranged so that the tip end of respective blade shell half parts 104, 106, 108, 152 extends beyond the root end of a neighbouring blade shell half part.

In the blade shell half part system 400, the transport system 102 comprises a first set of five separator elements arranged between and separating the first blade shell half part 104 and the second blade shell half part 106, a second set of five separator elements arranged between and separating the second blade shell half part 106 and the third blade shell half part 108, and a third set of five separator elements arranged between and separating the third blade shell half part 108 and the fourth blade shell half part 152. Each separator element of a set of separator elements at least partly overlaps corresponding separator elements in the other sets of separator elements. For example, a tertiary separator element of each set of separator elements at least partly overlaps with tertiary separator elements of the other sets of separator elements.

The invention has been described with reference to preferred embodiments. However, the scope of the invention is not limited to the illustrated embodiments, and alterations and modifications can be carried out without deviating from the scope of the invention that is defined by the following claims. The invention is not limited to the embodiments described herein, and may be modified or adapted without departing from the scope of the present invention. It is for instance noted that the embodiments are described for configurations where the blade shell half parts are arranged with their inner surfaces facing upwards. However, it is recognised that it is equally possible to arrange the blade shell half parts, or at least a part of the blade shell half parts, in a reverse configuration with the inner surfaces facing downwards. It is also possible to utilise the shape of the half shells and stack the blade shell half parts sideways, i.e. with the blades arranged horizontally neighbouring.

LIST OF REFERENCE NUMERALS 2 wind turbine
4 tower
6 nacelle
8 hub
10 blade
14 blade tip
15 tip end section
16 blade root
17 root end face
18 leading edge
20 trailing edge
22 pitch axis
24 pressure side blade shell half part/upwind blade shell half part
26 suction side blade shell half part/downwind blade shell half part
28 bond lines
29 horizontal
30 root region
32 transition region
34 airfoil region
50 airfoil profile
52 pressure side/upwind side
54 suction side/downwind side
56 leading edge
58 trailing edge
60 chord
62 camber line/median line
100, 200, 300, 400 blade shell half part system
102 transport system
104 first blade shell half part
106 second blade shell half part
108 third blade shell half part
110 tip end (of blade shell half part)
112 root end (of blade shell half part)
114 frame assembly
116 first transport frame
118 frame body
120 outer surface of the first blade shell half part
121 first end of frame assembly
121A second end of frame assembly
122 first support element
124 second support element
126 third support element 128 fourth support element
130 fifth support element
132 first primary separator element
134 first secondary separator element
136 first tertiary separator element
138 first quaternary separator element
140 first quinary separator element
142 second primary separator element
144 second secondary separator element
146 second tertiary separator element
148 second quaternary separator element
150 second quinary separator element
152 fourth blade shell half part
154 fifth blade shell half part
156 sixth blade shell half part
c chord length
$d_t$ position of maximum thickness
$d_f$ position of maximum camber
$d_p$ position of maximum pressure side camber
f camber
$l_f$ longitudinal distance between root end frames
$l_o$ longitudinal extent of blade tip overhang
L blade length
r local radius, radial distance from blade root
t thickness
D blade root diameter
Δy prebend
H root end transport frame height
W root end transport frame width
$D_f$ root end transport frame depth
h tip end transport frame height
X longitudinal axis

The invention claimed is:

1. A transport system for transport of blade shell half parts of a wind turbine blade, the blade shell half parts each having a tip end and a root end, wherein the transport system comprises:
    a frame assembly comprising a first transport frame; and
    a first set of one or more separator elements, the first set of separator elements including a first primary separator element configured to separate a first blade shell half part and a second blade shell half part neighbouring the first blade shell half part such that the second blade shell half part is at least partly stacked above the first blade shell half part, wherein the first set of separator elements is configured so that at least a part of the second blade shell half part is received within a cavity of the first blade shell half part.

2. The transport system according to claim 1, wherein the first primary separator element comprises a convex surface configured to contact the inner surface of the first blade shell half part.

3. The transport system according to claim 1, wherein the first set of separator elements is configured to separate a first blade shell half part and a second blade shell half part neighbouring the first blade shell half part such that an inner surface of the first blade shell half part faces an outer surface of the second blade shell half part.

4. The transport system according to claim 1, wherein the first set of separator elements is configured to separate a first blade shell half part and a second blade shell half part neighbouring the first blade shell half part such that an inner surface of the first blade shell half part faces an inner surface of the second blade shell half part.

5. The transport system according claim 1, wherein the first primary separator element comprises a convex surface configured to contact the inner surface of the second blade shell half part or a concave surface configured to contact the outer surface of the second blade shell half part.

6. The transport system according to claim 1, wherein the transport system comprises a second set of one or more separator elements, the second set of separator elements including a second primary separator element configured to separate the second blade shell half part and a third blade shell half part neighbouring the second blade shell half part.

7. The transport system according to claim 1, wherein the first transport frame comprises:
    a frame body; and
    at least one support element including a first support element configured to support a surface of a blade shell half part.

8. The transport system according to claim 7, wherein the frame assembly comprises a first sidewall.

9. The transport system according to claim 7, wherein the frame assembly comprises one or more support arms.

10. A blade shell half part system comprising a transport system according to claim 1 and a plurality of blade shell half parts each having a tip end and a root end and including a first blade shell half part and a second blade shell half part, wherein the first blade shell half part and the second blade shell half part are stacked on the frame assembly of the transport system.

11. The blade shell half part system according to claim 10, wherein the first blade shell half part and the second blade shell half part are stacked in a root end to root end arrangement.

12. The blade shell half part system according to claim 10, wherein the first blade shell half part and the second blade shell half part are stacked in a root end to tip end arrangement.

13. The blade shell half part system according to claim 10, wherein the first blade shell half part and the second blade shell half part are blade shell half parts of the same type or blade shell half parts of different types.

14. The blade shell half part system according to claim 10, wherein at least a part of the second blade shell half part is received within a cavity of the first blade shell half part.

15. A method for transporting or storing a plurality of blade shell half parts, the method comprising:
    supporting a first blade shell half part with a frame assembly comprising a first transport frame;
    arranging a first primary separator element on a surface of the first blade shell half part; and
    stacking a second blade shell half part on the first primary separator element so that at least a part of the second blade shell half part is received within the first blade shell half part.

16. The method according to claim 15, the method comprising:
    arranging a second primary separator element on a surface of the second blade shell half part; and
    stacking a third blade shell half part on the second primary separator element.

* * * * *